United States Patent
Van Der Knaap et al.

(10) Patent No.: US 10,948,928 B2
(45) Date of Patent: Mar. 16, 2021

(54) PLATOONING METHOD FOR APPLICATION IN HEAVY TRUCKS

(71) Applicant: DAF Trucks N.V., Eindhoven (NL)

(72) Inventors: Albertus Clemens Maria Van Der Knaap, Helmond (NL); Menno Adrianus Beenakkers, Gilze-Rijen (NL)

(73) Assignee: DAF Trucks N.V., Eindhoven (NL)

( * ) Notice: Subject to any disclaimer, the term of this patent is extended or adjusted under 35 U.S.C. 154(b) by 179 days.

(21) Appl. No.: 16/088,888

(22) PCT Filed: May 8, 2017

(86) PCT No.: PCT/NL2017/050285
§ 371 (c)(1),
(2) Date: Sep. 27, 2018

(87) PCT Pub. No.: WO2017/196165
PCT Pub. Date: Nov. 16, 2017

(65) Prior Publication Data
US 2020/0241563 A1    Jul. 30, 2020

(30) Foreign Application Priority Data
May 10, 2016  (NL) .................................. 2016753

(51) Int. Cl.
*G05D 1/02*   (2020.01)
*G08G 1/00*   (2006.01)
(Continued)

(52) U.S. Cl.
CPC ......... *G05D 1/0293* (2013.01); *B60W 30/165* (2013.01); *G05D 1/0088* (2013.01);
(Continued)

(58) Field of Classification Search
CPC .. G05D 1/0293; G05D 1/0088; G05D 1/0278; G05D 2201/0213; G05D 1/02;
(Continued)

(56) References Cited

FOREIGN PATENT DOCUMENTS

| DE | 10-2015-010535 | * | 2/2016 |
| DE | 102015010535 A1 | | 2/2016 |

OTHER PUBLICATIONS

Tsugawa, Sadayuki: "Results and issues of an automated truck platoon within the energy ITS project", 2014 IEEE Intelligent Vehicles Symposium Processings, IEEE, Jun. 8, 2014 (Jun. 8, 2014), pp. 642-647, XP032620367, DOI: 10.1109/IVS.2014.6856400.*

(Continued)

*Primary Examiner* — Brian P Sweeney
(74) *Attorney, Agent, or Firm* — Banner & Witcoff, Ltd.

(57) ABSTRACT

A method for guiding a motor vehicle on the basis of image data when autonomously driving the motor vehicle in platooning formation following a leading vehicle, by a steering controller coupled to a steering system and a headway controller receiving and controlling a vehicle's interdistance relative to a leading vehicle, said method comprising controlling, by the steering controller, the vehicle's lateral distance relative to a first lane side, said steering controller receiving inputs from a first lane side detector mounted on a first front side location of the vehicle, and from a second lane side detector mounted on a second front side location opposing said first front side location, wherein said first and second lane side detectors are spaced apart over or wider than the vehicle's width.

13 Claims, 5 Drawing Sheets

(51) Int. Cl.
   *B60W 30/165* (2020.01)
   *G05D 1/00* (2006.01)
   *H04W 4/46* (2018.01)

(52) U.S. Cl.
   CPC .............. *G08G 1/22* (2013.01); *G05D 1/0278* (2013.01); *G05D 2201/0213* (2013.01); *H04W 4/46* (2018.02)

(58) Field of Classification Search
   CPC ...... B60W 30/165; B60W 30/12; G08G 1/22; H04W 4/46; B60R 1/00
   USPC .......................................................... 701/23
   See application file for complete search history.

(56) References Cited

OTHER PUBLICATIONS

Jun. 8-11, 2014—Tsugawa, Sadayuki, "Results and Issues of an Automated Truck Platoon within the Energy ITS Project" p. 642-647.
Oct. 14-17, 2012—Alfraheed, Mohammad "A Mechanism to Improve Stereo Vision Systems in Automated Heterogeneous Platoons" pp. 425-432.
Sep. 5, 2017—ISR & WO PCT/NL2017/050285.

* cited by examiner $Lateral\_output = f(\alpha) \cdot Roadhook\_output + (1-f(\alpha)) \cdot VehicleFollowing\_output$

PLATOONING METHOD FOR APPLICATION IN HEAVY TRUCKS

CROSS-REFERENCE TO RELATED APPLICATIONS

This application is a U.S. National Stage application under 35 U.S.C. § 371 of International Application PCT/NL2017/050285 (published as WO 2017/196165 A1), filed May 8, 2017, which claims the benefit of priority to Application NL 2016753, filed May 10, 2016. Benefit of the filing date of each of these prior applications is hereby claimed. Each of these prior applications is hereby incorporated by reference in its entirety.

FIELD OF INVENTION

The invention relates to a method of autonomous platooning of heavy trucks.

DESCRIPTION OF THE PRIOR ART

Heavy trucks of today are equipped with steering systems, where the introduction of an electromotor (either as add-on system or even as full replacement of the hydraulic system) has become state of the art. The electromotor engages the wheels and supports the steering wheel movements. These electric steering systems all have in common that they need a control system with sensors. Moreover, these control systems are connected to other vehicle control systems. Such active steering systems may also be used to implement Advanced Driver Assistance Systems, that may be used to interact with the driver, aid him in traffic situations, and even facilitate autonomous driving. A major challenge is to provide driver assistance, or even autonomous driving support, in platooning applications for heavy trucks, in particular trailer truck combinations. Platooning, i.e. driving in convoy by two or more trucks, such as trailer truck combinations, substantially increases the fuel efficiency of trucks on the one hand and relieves the burden for the driver in this highly precise high speed maneuvering task with reduced vision on the other hand. Furthermore (road) safety is enhanced as the human factor is eliminated and road usage (meaning more truck-trailers per road length sections) is maximized by short distance driving. Last but not least driver effectiveness can be improved as the driver can do other tasks like administration, resting, etc. during the journey in case of autonomous driving mode. Platooning is the basis for new future automated logistic transport concepts. There is high need to develop and optimize these systems.

One of the many challenges is the limited view, even for camera sensing systems, in order to provide a reliable platooning control system of two trucks following each other at close distance, e.g. less than 10 meters, or even less than 5 meters. This requires a vehicle following control system with response times that are significantly below the human reaction times which is in the range of 1 to 1.5 sec depending on the (trained) skills and alertness level of the driver. State-of-the-art in platooning and corresponding sensor system have latency time ranging from 200 to 500 ms. These delay times limit the minimization of vehicle following distance (the smaller, the higher the platooning benefit). To compensate for these 'sluggish' platooning control system responses also vehicle-to-vehicle communication is installed to wirelessly (via WiFi) transmit actual vehicle states such as acceleration, deceleration and steering angles from predecessor to following vehicles. This works sufficiently well for the longitudinal vehicle following or headway control part, but appears to be still cumbersome regarding optimization of lateral vehicle following control (e.g. related to lane changes and driving to curved lanes). One should note that steering not only yields a lateral displacement of the vehicle but also invokes a yaw motion. Considering a truck-trailer combination it is obvious that this complexity drastically rises in comparison to rigid vehicles. For instance 'tail-waggling', 'trailer-sway' and 'cutting-corner' effects need to be avoided. Hence there is a need for improved robust lateral platooning control concepts and methods. Thus, while these systems are beginning to surface in, in heavy truck (commercial) vehicles, in particular of the type of more than 6 tonnes, there is still a considerable challenge for dimensioning these systems, in view of the difficulty of driving at close distance of a trailer combination, that provides challenging requirements for e.g. sensor latency, camera field of view, and sensor signal quality, due to stability and performance requirements for short distance driving. For such platooning applications e.g. string stability, under-/overshoot on driving distance and emergency braking are challenges that pose practical problems for the current state of the art technology.

In particular, it is not quite possible to follow a lateral truck trailer combination, since this is only an indirect measure of the truck vehicle steering movements. If this is not handled properly this could lead to resonant kinematic behavior of the following truck due to lack of system damping in the overall platooning vehicle following control system In other prior art systems, e.g. DE102015010441 it is contemplated to determine a position of a transport vehicle and analyzing a scene by a plurality of camera views with non-overlapping detection areas. The camera's work together in an algorithm to determine lane course, in particular, when a field of view is partially blocked by a moving object.

Also in DE102015010535 a plurality of camera's is used for detecting an environment around a transport vehicle. In the arrangement, a central forward looking camera is provided in addition to side cameras monitoring a side range of the vehicle and (partly) replacing rear view mirror. In an example a compromise is reached by a camera combination to view the side lane markings and traffic signs. No platooning is mentioned.

In Tsugawas Adayuki: Results and issues of an automated truck platoon within the energy ITS project", 2014 IEEE intelligent vehicles symposium proceedings IEEE, Jun. 8 2014 machine vision units are provided on the front and on the rear of the truck. In this position, lane side markings cannot be reliably detected in a platooning condition.

There is a need to provide an reliable method for autonomously platooning a trailer truck combination in a practical set up. Furthermore an efficient computing algorithm for localization of the leading truck-trailer vehicle combination, specifically the back of the predecessor trailer with respect to lane course and the truck-trailer position and heading (or yaw-angle) of the following vehicle itself with respect to the lane course is needed. The latter is used for in-vehicle (feedback) control of ego-motion in order to avoid instable resonances while following the predecessor in lateral sense. Apart from this there is also a need to have a redundant (vehicle inter-distant) headway measurement system means, particularly relevant for reaching SAE level 3, 4 and 5 of automation where the autonomous driving system needs to monitor it's own safety status. Currently, usually the combination of a radar and GPS sensor mostly fused with a forward looking mono-camera that uses so-called 'structure-for-motion' techniques is applied to make a reliable estimate for the headway distance measurement. In this sense it would be highly desirable to have installed a highly accurate direct measurement system in the form a stereo camera system to improve robustness and reduce system latency time. This invention envisages also a solution in this respect.

SUMMARY OF THE INVENTION

It is aimed to provide a method for guiding a motor vehicle on the basis of image data when autonomously driving the motor vehicle in platooning formation following a leading vehicle, by a steering controller coupled to a steering system, and a headway controller receiving and controlling a vehicle's inter-distance relative to a leading vehicle, said method comprising: controlling, by a lateral controller coupled to said steering controller, the vehicle's lateral distance relative to a first lane side, said lateral controller receiving inputs from a first lane side detector mounted on a vehicles first front side location, and from a second lane side detector mounted on the a vehicles second front side location opposing said vehicles first front side location, said input being a reference distance to an observed first and/or second lane side, wherein said first and second detectors are spaced apart over a distance equal or wider than the vehicle's width.

Preferably, the steering controller controls the steering system based on a damped lateral distance control of the vehicle detected by said lane side detectors, relative to any of first and second lane sides. Accordingly the damping function is targeting for stable vehicle ego-motion behaviour during lane changes and/or lateral displacement or yaw disturbances in the vehicle following platooning system Accordingly, (under- and overshoot) steering errors can be prevented to propagate from a leading vehicle through the platoon.

BRIEF DESCRIPTION OF THE DRAWINGS

The invention will be further elucidated in the figures.

DETAILED DESCRIPTION

Figure 1:
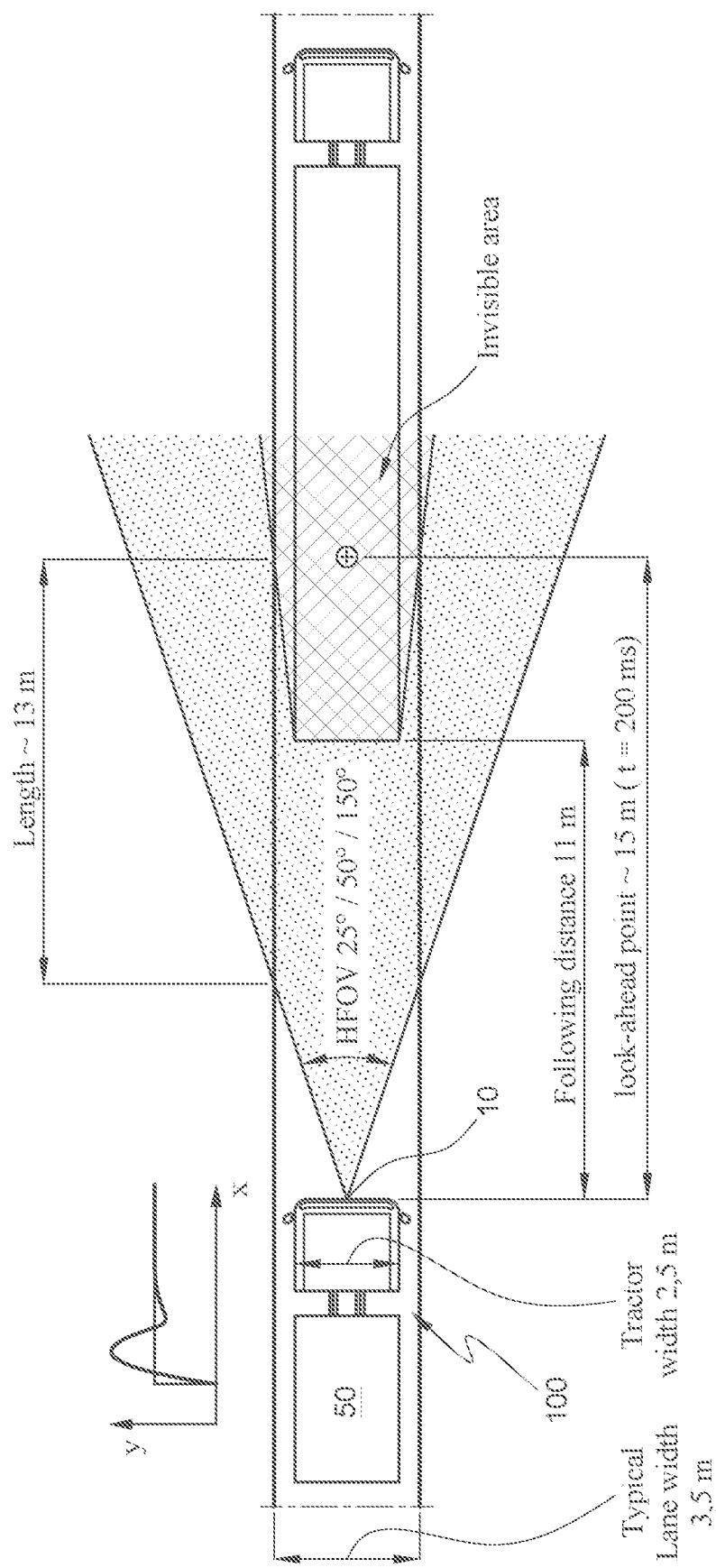
FIG. 1 shows a prior art setup of guiding of a motor vehicle on the basis of image data when autonomously driving the motor vehicle in platooning formation following a leading vehicle.

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

The term "controller" is used in a conventional way to signify any structural hardware or software arrangement having a capability of executing program logic in order to provide a certain basic function. A skilled person is typically aware of how to operate or implement a circuit in the context of the description, with processor elements elucidated here below. For example, an 'steering controller' comprises hard/and or software elements dedicated to the purpose, as further illustrated here below, of identifying a truck's current position. This information is used to calculate set points as input for the actual active steering system that (vertically) rotates the wheels on the road in order to follow the desired (vehicle following) path of the vehicle.

Moreover a headway controller has program logic to control the engine transmission and brake of the truck, in order to accelerate or decelerate the truck, to regulate a set headway or set interdistance between the truck and a leading vehicle. The headway controller program logic may comprise feedback control circuitry, that is based on sensor inputs that measure an interdistance between the truck and leading vehicle, from a radar, lidar, stereo camera image or combinations thereof, optionally in addition to feed forward control circuitry of control inputs received via signal lines from the leading vehicle.

A lateral controller has program logic to control the steering system of the truck, to regulate a set lateral inter-distance between the truck and a lane or road side marking. The lateral controller program logic may comprise feedback control circuitry, that is based on sensor inputs that measure an lateral interdistance between the truck and a lane or road side marking, from a radar, lidar, stereo camera image or combinations thereof, optionally in addition to feed forward control circuitry of control inputs received via signal lines from the leading vehicle. A lateral controller is communicatively connected to a steering controller, that actively controls the steering motion of the truck's steering wheels. In certain embodiments, lateral and headway control are combined in a single control system. The term "program logic" is used in a conventional way to signify the operating instructions, which may be embodied in hard—or software structures, that control a circuit to the designated functional behavior.

The term "signal line" is used in a conventional way to signify an information exchanged via signal transmission, which may be in the form of coded signals, in analog or digital fashion by any conventional communication device, where it is not excluded that other signal lines are available, but merely to signify that a certain connectivity is available.

This may also indicate indirect connectivity, that is, a signal line may be provided by indirect signaling, for example, via another functional device.

The processor may be a dedicated processor for performing in accordance with the present system or may be a general-purpose processor wherein only one of many functions operate for performing in accordance with the present system. The processor may operate utilizing a program portion, multiple program segments, or may be a hardware device utilizing a dedicated or multi-purpose integrated circuit. Any type of processor may be used such as a dedicated or shared one. The processor may include microcontrollers, central processing units (CPUs), graphical processing units (GPUs), digital signal processors (DSPs), ASICs, or any other processor(s) or controller(s) such as digital optical devices, or analog electrical circuits that perform the same functions, and employ electronic techniques and architecture. The controller or processor may further comprise a memory that may be part of or operationally coupled to the controller. The memory may be any suitable type of memory where data is stored. Any medium known or developed that can store and/or transmit information suitable for use with the present systems and methods may be used as a memory. The memory may also store user preferences and/or application data accessible by the controller for configuring it to perform operational acts in accordance with the present systems and methods.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

FIG. 1 shows a generic setup of a prior art embodiment wherein a vehicle's 100 current position is identified by means of a forward looking camera 10 with an opening angle typically ranging from 25° to 150° that is mounted in a central position at the front of the vehicle. The vehicle 100 may be a single truck or trailer truck combination. The camera may either be a tri-focal camera, which substantially expands the camera view in lateral and forward direction, a stereo-camera with an advantage of instant depth measurement or a mono camera as used for current state-of-the-art lane keeping assist systems. The camera is typically mounted behind the front screen of the vehicle, and is coupled to a steering controller coupled to a steering system of the vehicle 100. In order to realize a platoon, longitudinal vehicle control and lateral vehicle control are carried out by a headway controller and a lateral controller which is embodied in the steering controller. In the prior art setup, the main objective for lateral control in platoons is to follow the leading vehicle. In this respect it is undesired to propagate (under- and overshoot) steering errors from the front vehicle through the platoon. Additionally, while driving in non-straight lanes (cornering), the back of the leading vehicle's trailer 50 will be off-set from its tractor position in the lane, resulting in an increased amount of corner cutting, should this trailer position be the sole information source for steering the following vehicle(s). An illustrative representation of the error propagation of the steering error in the prior art setup is found its annexed x-y graph in FIG. 1.

Accordingly, the motor vehicle can be guided on the basis of image data obtained from the camera 10, when autonomously driving the motor vehicle in platooning formation following a leading vehicle. However, due to the limited forward and side extent, the trailing distance relative to the leading vehicle is quite long, typically not closer than 10 meters and typically larger than 15 meters. This method provides a headway control of which the performance may be improved by fusing the camera signal with the signals coming from an additional forward looking radar and or laser scanner system. Also vehicle-to-vehicle communication of acceleration and deceleration signals from predecessor to following vehicle may play an important role in this respect. However, lateral control suffers from propagation of steering errors of the preceding vehicle(s) downstream the platoon.

Figure 2:
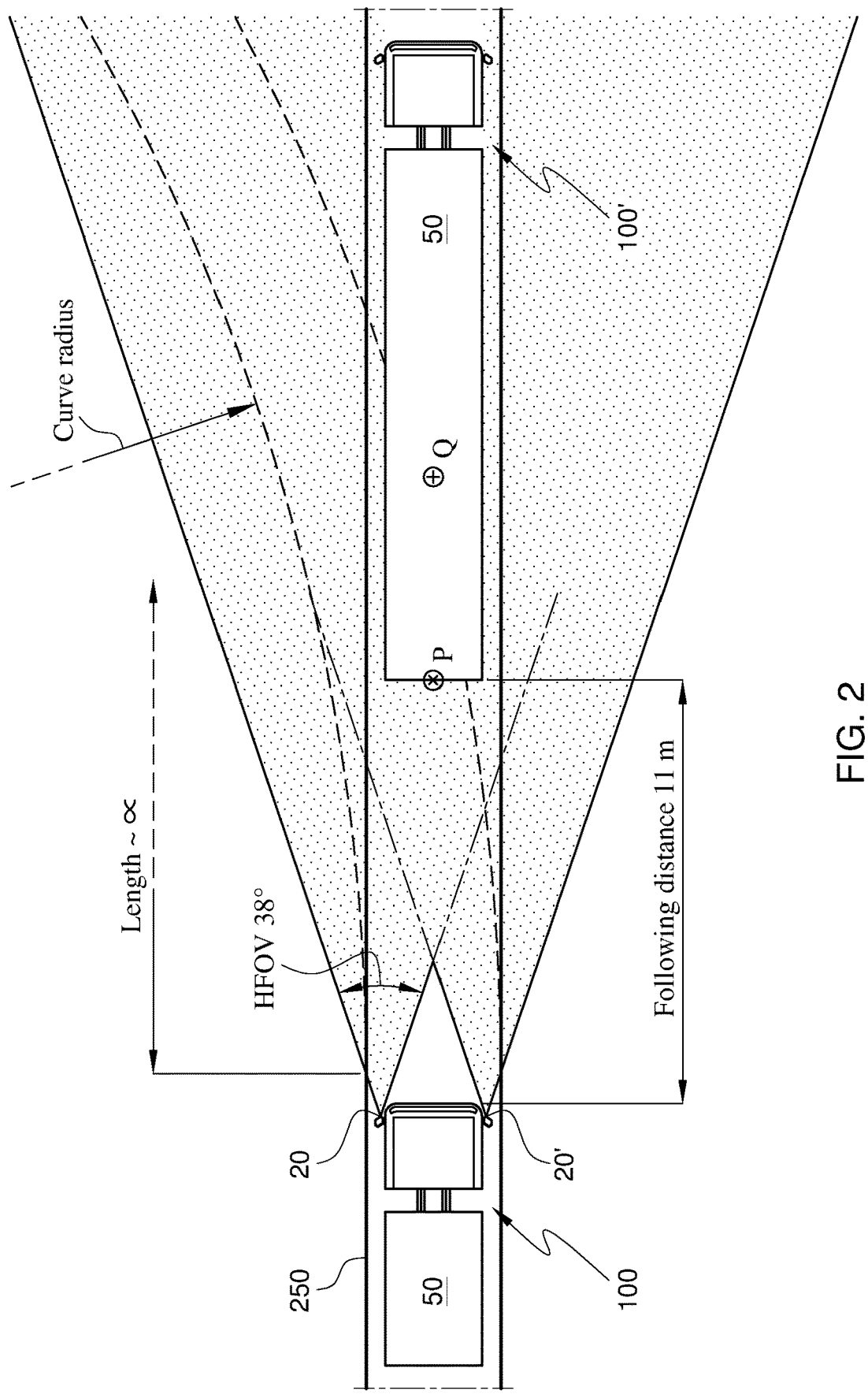
FIG. 2 shows a setup according to an embodiment of the present invention.

In FIG. 2 a detector setup is shown according to an embodiment of the invention. In this embodiment, a lane side detector is provided, which can be e.g. camera or laser based. Consequently the motor vehicle 100 is driven in platooning formation following a leading vehicle 100', by a steering controller coupled to the vehicles steering system (not shown). The method comprises identifying the vehicle's current position relative to a lane side 250 by a lane side detector 20 mounted on a vehicles first front side location, preferably on the vehicles side mirror. A further lane side detector 20' is mounted on the vehicles second front side location opposing said vehicles first front side location, relative to the vehicles length axis. The lane side detectors 20, 20' provide a reference lateral distance value to the steering controller relative to an observed first and/or second lane side. In this setup forward looking camera's 20, 20' define a dual camera basis larger than the vehicles width, i.e. first and second detectors are spaced apart over a distance equal or wider than the vehicle's width.

In the depicted embodiment, the lane side detectors may be further equipped to provide an of image the leading vehicle located in front of the vehicle. The steering controller may thereby control the steering system to steer the vehicle according to reference value derived from said image. The same detector can thus also be used to determine the position of the trailer of the preceding vehicle in the platoon apart from its own lateral position with respect to the lanes which is an crucial input for stable feedback control of ego-motion. For longitudinal control, the proposed method has the advantage of providing a stereo camera view with a large base (distance between the cameras), resulting in substantially more accurate depth perception and consequently a more accurate distance measurement for the preceding trailer compared to current state-of-the-art stereo video cameras. Note that nowadays single module stereo cameras typically apply a base distance of no longer than 10 cm width between the actual camera eyes. With this new proposed setup of two separately fused mono cameras located and the left and right side of the vehicle, the base length is maximised typically up to a distance of approximately 250 cm, meaning a factor of twenty five increase in depth measurement accuracy which yields near centimeter measurement precision at a forward looking distance up to 300 m, but also down to 5 meters or even less. The lane side detector 20 can thus be equipped to image a reference point P at the back of the trailer of the leading vehicle 100' located at a forward distance. This is a distance typically much smaller than the headway distance attainable in the FIG. 1 embodiment, i.e. smaller than 15 m, typically about 5 to 10 meters. In this way a vehicle inter-distance or headway can be calculated relative to the leading vehicle in a stereo image derived from said opposed lane side detectors 20, 20'. The advantage is that from the same image, the lane side detection and the reference point calculation can be performed, which improves the reliability and reduces the number of algorithmic processing steps, which may provide latency times at a guaranteed minimum, since the control values for the steering controller are derived from the same source image with all the advantages that this entails to reduce system latency times, critical for reliable and safe platooning applications. Thus simultaneous measurement of the relative position of the current lane relative to the own vehicle is possible, as well as the relative position and heading of the preceding trailer relative to this lane. Advantageously the camera inputs are provided to the steering controller to provide a lateral control of the vehicle 100 based on a damping function further explained in FIG. 4, in order to control a lateral distance of the vehicle relative to detected lane sides. Using simultaneous measurements from a stereo image derived from said opposed lane side detectors, the response of the vehicle during lane changes can be damped based on the position of the lane, preventing the following vehicles in the platoon from overshooting the desired position in the new lane, which would occur when solely following the preceding vehicle. An effect known as "steering error propagation", which is a domino-effect that causes an (string-)instable lateral shock wave downstream the platoon making the last vehicle's in the platoon laterally leave the available paved free space and may be even collide with other passing-by (taking over) or upcoming vehicles in the lanes next to the platooning lane.

Moreover, as the lane detector is mounted outside the vehicle width, at least one of the devices is always able to measure the relative position, relative heading and curve radius of the current lane. This facilitates stabilization of the steering control, using the outside world (current lane) to correct for steering errors of the leading vehicle and preventing position overshoot/undershoot while steady state cornering.

The lane side detectors 20, 20' in FIG. 2 have as a further benefit that the lane sides located left and right and relevant orientation from the leading vehicle in front relative to the reference points P and or Q, are visible at all times. Point Q is a virtual point located on the road typically ranging between 10 m to 30 m (the exact value is a tuning parameter in the steering controller to influence the trade-off between yaw damping and turning agility while taking sharp corners) in front of the following vehicle and may be situated under the trailer of the predecessor or even in front of the predecessor. By using virtual point Q, roadhook control can thus be optimized aiming for a stable, but agile yaw motion vehicle behaviour by detecting or calculating a further lateral distance from the observed freely visible lane side markers left and right of the leading vehicle relative to Q. This further lateral distance in front of the of the following vehicle relative to a lane or road side marking can be fed back to the lateral controller 400 (indicated by the damper in FIG. 4A). It is noted that such detectors have sensor hardware that is known per se and are here denoted as 'lane side detectors' to indicate their function for detecting a lane side in a data set, which may be provided from a camera or 2D or 3D scanner of other detector suitable for the purpose. A scanner is preferably of a laser scanning type, but may also be provided by different means, e.g. acoustic, or by means of camera's equipped with object recognition software. A laser scanner typically has a resolution of less than 10 cm, or even less than 5 cm, which is an important advantage for exact platooning of the truck, in particular, the trailer 50.

In an embodiment, the image data may be provided from cameras or as scan data from 2D or 3D scanners, formed by sets of reflection angles and corresponding reflection distances detected by said scanners. The scan data, signifying a set of laser reflections (2D or 3D angle and reflection distance) may be analyzed to identify at least a reference point of the leading trailer. The steering controller can be embodied in software and/or hardware and can be on-board or off board of the truck. It calculates the vehicle steering and driving parameters, necessary to steer and drive the vehicle to the steering controller's instructions i.e. according to a path that keeps the reference point substantially constant relative to the vehicle 100'. For this purpose reference point P on the back of the truck-trailer is most relevant. In case of lateral (dynamic) disturbances however, related to tail-swing at lane changes, reference point Q a virtual point attached to the road is mainly used for computation of the needed road hook stabilizating damping forces in addition the basic vehicle following control strategy.

Furthermore, optionally, the reference point may be calculated or validated, e.g. by Kalman type filtering, from other sensors, e.g. in areas where the scanner cannot look. E.g. the reference position can be further measured by conventional means, e.g. on-board parking sensors, ABS encoders and accelerators. These additional sensors can also be used to optimize the driver interaction; e.g. by smoothen the accelerations or steering action according to preset constraints.

For a regular rectangular trailer, the detector can see either a long side, a short side or both the long and short sides of the trailer. When two sides are visible, one has to distinguish whether the long side is on the left or on the right. This can be done by tracking a line segment along the frames; and calculating for both sides a longest line segment; based on visible lines and a derived trailer orientation. The reference point P can subsequently be derived by matching said orthogonal directions with a visibility scenario of the trailer; one of which scenario's is chosen as an optimal scenario for identifying the reference point.

Figure 3:
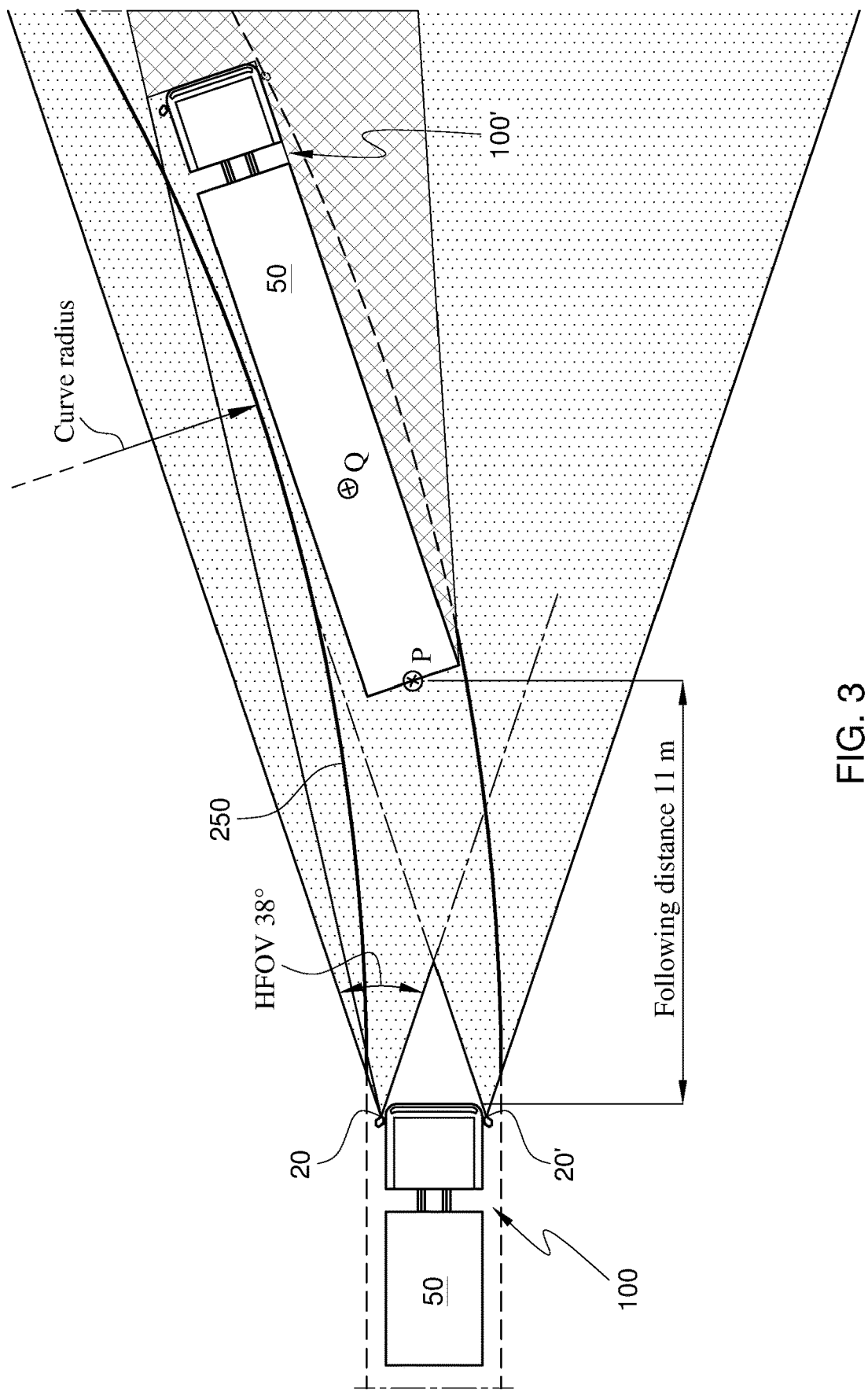
FIG. 3 shows the setup of FIG. 2 in a bending curve of a road lane.

FIG. 3 shows a schematic view of the setup for the steering controller wherein a look ahead point Q is calculated at a forward distance larger than the vehicles inter-distance relative to the leading vehicle, wherein the steering controller controls the steering system based on a damping function that controls the lateral distance between the look ahead point Q and the lane side 250', which in this example is curved.

Having the lane side detectors mounted on a vehicles first front side location, preferably on the vehicles side mirror, provides an advantage of constant view, also in bending lanes, on at least one side of the lane side markers. The look ahead point Q, that is calculated virtually midway of the leading trailer is used for lateral road hook control error minimization, in addition to the lane side detection.

Figure 4A:
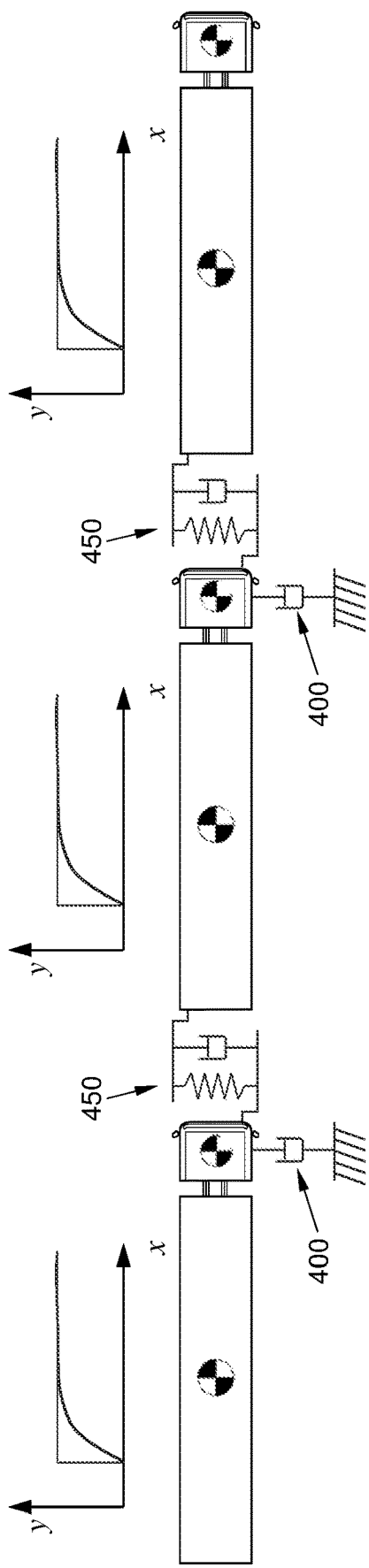
FIG. 4a shows a principle of road hook control in addition to a conventional lateral vehicle following control setup, with in FIG. 4b an exemplary output control that actively balances between these two complementary lateral control strategies.

By said road hook damping concept wherein the steering system is controlled based on a damping function that controls the lateral distance between the reference point Q and the lane side, under- and overshoot steering errors can be prevented, as visualized in FIG. 4A. The proposed perception concept allows simultaneous measurement of the relative position of the current lane w.r.t. the own vehicle, as well as the relative position and heading of the preceding trailer w.r.t. this lane. Using these simultaneous measurements, the response of the vehicle during lane changes can be damped based on the position of the lane, preventing the following vehicles in the platoon from overshooting the desired position in the new lane, which would occur when solely following the preceding vehicle. In a case that the lane side detectors are equipped to provide an image of the leading vehicle located in front of the vehicle, the steering controller may control the steering system to steer the vehicle according to a reference value derived from said image. This can be arranged by a feedback control loop 450 (proportional differential feedback or PD action) as visualized by the spring-damper elements 450 laterally interconnecting the following vehicles in the platoon. The x-y graph shows that the roadhook damper control system, schematically represented by damped lateral distance control 400 of the vehicle, is capable of smoothening the lateral y distance step within longitudinally travelled distances at driving speed within seconds. Moreover, as the lane detector is mounted outside the legal vehicle width, therefore always allowing at least one of the devices to measure the relative position, relative heading and curve radius of the current lane. This facilitates stabilization of the steering control, using the outside world (current lane) to correct for steering errors of the leading vehicle and preventing position undershoot while steady state cornering.

Figure 4B:
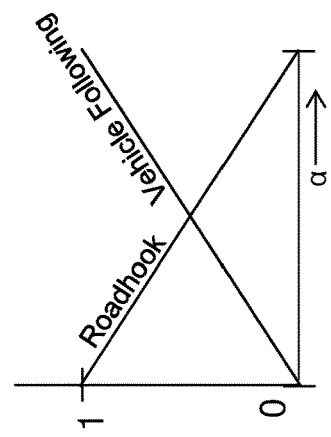

A schematic scalable weight function for a feed back/feed forward loop is illustrated to render the damping function as shown in FIG. 4B. This weight function can control multiple objectives for lateral control in platoons wherein the steering controller arbitrates, in non-straight steering courses, between the lateral distance and the reference value. A first objective may be that the following vehicle remains within the same lane as the leading vehicle based on lane side detection. A second objective may be that the following vehicle follows the leading vehicle to e.g. an adjacent lane when a lane change is performed, based on the calculated look ahead point. The weight function is designed to arbitrate and smoothly balance between the different use cases.

FURTHER EMBODIMENTS

Figure 5:
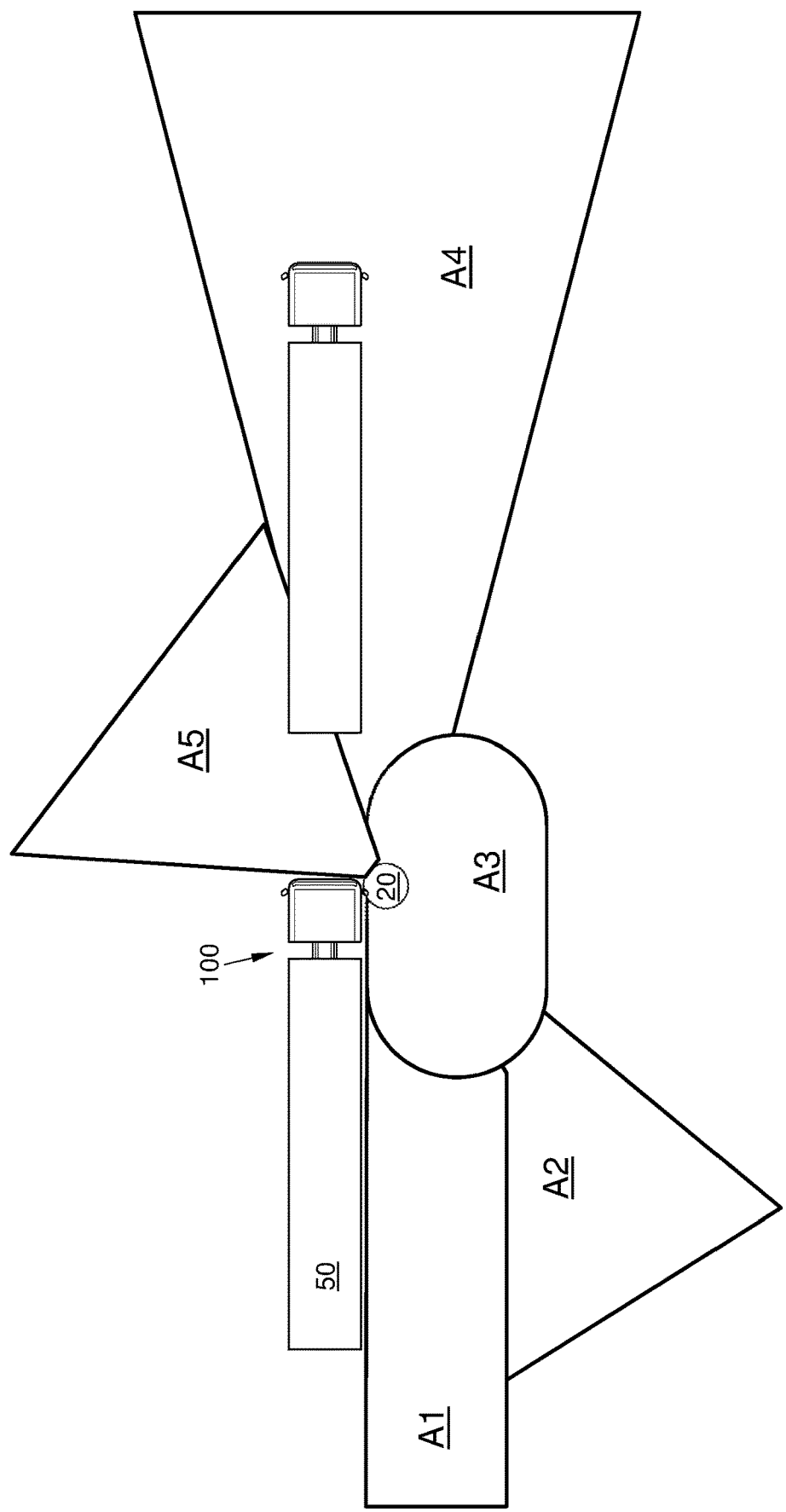
FIG. 5 shows a further embodiment for further camera controls mounted on a side mirror.

FIG. 5 shows a further exemplary embodiment wherein said lane side detector is integrated as a forward looking camera in a front side mirror.

Additionally said front side mirror may further comprise a first camera imaging side area A1 extending rearward and alongside the vehicle; a second camera imaging a side area A2 extending sideways away from the vehicle; a third camera imaging a side proximity area A3 of the vehicle, typically being a blind spot detection camera in the form of so-called fish-eye camera lens to detect vulnerable road users like pedestrians and cyclists in the near side vicinity of the truck.

These three cameras covering the vision areas A1, A2 and A3 can be regarded as typical state-of-the-art system solutions where conventional external rear view mirrors (basing on a object 'reflection' principle with direct line of sight for the driver) are being completed or replaced by rearward and/or downward looking camera's for the purpose of improving fuel economy by effectively reducing the truck's frontal surface and thus reducing the aerodynamic drag forces. The viewed video streams from this camera's are stitched together and showed to the driver via displays (or monitors) strategically placed behind the A-pillars of the cabin and giving additional blind spot information in an intuitive manner. Once these camera system are in place designated ADAS function applications can be fed such as "City-Turn Assist" (avoiding run-overs of vulnerable road users at turning around a corner), "Passive and Active Lane Change Assist" (which detects traffic, like passenger cars either upcoming or being overtaken, in the lanes left and right of the truck-trailer combination and warns and even intervenes when the driver trying to pull over and an accident is eminent). But also "Rearward Collision Warning" and Auto-Backing functions may want to use the valuable camera signals.

The combination of these state-of-the-art so-called "camera-mirrors" with forward looking camera 20 (with image area A4) according to the scope of this invention (for reference see also left and right cameras with reference numbers 20 and 20' in FIG. 3 provides a considerable cost and weight saving design and is enabling an advantageous system integration once afore mentioned ADAS functions are combined into one system and fused together in a so-called "central ADAS domain controller" (not indicated in FIG. 5). All needed camera sensors and their corresponding semiconductor components and printed circuit boards can be mounted and housed together into one central bracket system at both sides of the cabin.

To complete the near 360° camera sensor suite (or to fulfill the 360° surround vision requirement) as needed for (semi-)autonomous driving according to the SAE International Standard J3016 levels 3, 4 and 5 of automation one may need want to install one additional sensor with a vision area A5 looking more or less downwardly to the near front and into the opposing vehicle side effectively detecting objects (like compact cars, cyclist and pedestrians) that are situated in the remaining blind spot in the near front of the vehicle and that are out of the field of that are covered by the lane side detectors 20 and 20' that are scope of this invention.

The area A4 is imaged by the lane side detector 20. By having the above described further cameras for respective image areas A1, A2, A3 and A5 platooning control can be further enhanced with arbitration from images of the further cameras. In one embodiment, said weight function arbitrates to unique lane side control, when a vehicle is identified in the first camera imaging side area A1 extending alongside the vehicle. In another embodiment, headway controller is provided with an inter-distance arbitration function that controls the inter-distance based on a detected vehicle cutting in the inter-distance between the leading vehicle. This arbitration may include steering control by the steering.

Further cost and weight saving integration solutions which are particularly relevant for the platooning use case are seen in the combination of the above described five camera sensors according to the description of FIG. 5 (but not specifically drawn for reasons of clarity) with GPS units, a vehicle-to-vehicle WiFi-p based communication system, redundant communication means like LED line-of-sight communication system in case the WiFi-p communication fails (specifically relevant to fulfill the safety requirements of SAE-level 3, 4 and 5 of platooning) and further wireless mobile connectivity means like 4G and 5G in order to provide functional software updates over-the-air and/or connection to other "cloud services" like actual traffic information and specific logistic provider services. Also integration of radar circuits (either short-, mid- and/or long range) covering one or more of the vision areas A1 to A5 are considered as useful cost and weight saving integration opportunities in addition to these camera mirrors. The signals coming from this small radar systems are to be fused with the signals from the camera to enhance the reliability and accuracy of the detected objects. In an embodiment, a radar detector may be mounted on a vehicles side location, arranged to detect a passing vehicle in a lane annexed to the vehicle. The steering controller may thus arbitrate between the lateral controller, the reference value, and a detector signal from the radar detector. For example, the radar detector may detect a fast moving vehicle approaching from behind in an annex lane. All these sensor and communication systems can all be accommodated in a compact housing and can provide signal lines that are, due to the integrated nature of the detectors in a single integrated side mirror device, also suitable for high speed (larger than 10 Gb/s) fiber connection to a central communication bus. The side mirror device is preferably mounted on a fixed part of the cabin, on a side thereof, which has an advantage that connection lines of the mirror device that need not be integrated in movable parts, in particular, the cabin door. In another option, graphics processing of the signals from signal lines of the mirror devices may be provided 'in situ' i.e. in the device itself or in a corresponding connector part in close vicinity of the camera device, in order to avoid long HD streaming signal cables.

In yet another option, the mounting of the side mirror device is provided with impact securing means, e.g. in the form of a steel cable etc, to prevent that the device is torn of the cabin in case of impact or vandalism. These securing means can be electronically linked to a signal processing means, in order to warn that the system is in malfunction.

The invention claimed is:

1. A method for guiding a motor vehicle on the basis of image data when autonomously driving the motor vehicle in platooning formation following a leading vehicle, by a steering controller coupled to a steering system, and a headway controller controlling a vehicle's interdistance relative to a leading vehicle, said method comprising: controlling, by the steering controller, the vehicle's lateral distance relative to a first lane side, said steering controller receiving inputs from a first lane side detector mounted on a vehicle's first front side location, and from a second lane side detector mounted on the a vehicle's second front side location opposing said vehicle's first front side location, wherein said first and second detectors are spaced apart over or wider than the vehicle's width,
  wherein the first and second lane side detectors are further equipped to provide an image of the leading vehicle located in front of the vehicle, wherein the steering controller controls the steering system to steer the vehicle according to a reference value derived from said image.

2. A method according to claim 1, wherein the steering controller controls the steering system based on a lateral distance control of the vehicle, said lateral distance detected by said lane side detectors, relative to any of first and second lane sides.

3. A method according to claim 1, wherein the headway controller receives said interdistance relative to the leading vehicle calculated from a stereo image derived from said opposed lane side detectors.

4. A method according to claim 1, wherein the reference value is a look ahead point that is located at a forward distance larger than the vehicle's interdistance relative to the leading vehicle.

5. A method according to claim 1, wherein said steering controller arbitrates, in non-straight steering courses, between the lateral distance and the reference value.

6. A method according to claim 1, wherein said steering controller is wirelessly connected to a steering controller of said leading vehicle; said leading vehicle steering controller arranged to compute steering control parameters of the leading vehicle to autonomously drive the trailing vehicle in a control function derived of the leading steering controller.

7. A method according to claim 1, wherein said first and second lane side detectors are 2D or 3D laser scanners; wherein scan data is formed by sets of reflection angles and corresponding reflection distances.

8. A method according to claim 1, wherein said first and second lane side detectors are each integrated as a forward looking camera in an external rearward looking front side mirror or mirror replacing means.

9. A method according to claim 8, wherein said front side mirror further comprises a first camera imaging a side area extending sideways behind the vehicle; a second camera imaging a side area extending sideways away from the vehicle; a third camera imaging a side proximity area of the vehicle; and a front blind spot camera imaging the area directly before the vehicle.

10. A method according to claim 8, wherein said front side mirror further comprises any of a GPS unit for localization, a WiFi based vehicle-to-vehicle communication system, or a redundant communication means.

11. A method according to claim 8, further comprising a radar detector mounted on a vehicle's side location, arranged to detect a passing vehicle in a lane annexed to the vehicle, wherein said steering controller arbitrates between the lateral controller, the reference value, and a detector signal from the radar detector.

12. A method for guiding a motor vehicle on the basis of image data when autonomously driving the motor vehicle in platooning formation following a leading vehicle, by a steering controller coupled to a steering system, and a headway controller controlling a vehicle's interdistance relative to a leading vehicle, said method comprising: controlling, by the steering controller, the vehicle's lateral distance relative to a first lane side, said steering controller receiving inputs from a first lane side detector mounted on a vehicle's first front side location, and from a second lane side detector mounted on the a vehicle's second front side location opposing said vehicle's first front side location, wherein said first and second detectors are spaced apart over or wider than the vehicle's width,
  wherein said first and second lane side detectors are 2D or 3D laser scanners; wherein scan data is formed by sets of reflection angles and corresponding reflection distances.

13. A method for guiding a motor vehicle on the basis of image data when autonomously driving the motor vehicle in platooning formation following a leading vehicle, by a steering controller coupled to a steering system, and a headway controller controlling a vehicle's interdistance relative to a leading vehicle, said method comprising: controlling, by the steering controller, the vehicle's lateral distance relative to a first lane side, said steering controller receiving inputs from a first lane side detector mounted on a vehicle's first front side location, and from a second lane side detector mounted on the a vehicle's second front side location opposing said vehicle's first front side location, wherein said first and second detectors are spaced apart over or wider than the vehicle's width,
  wherein said first and second lane side detectors are each integrated as a forward looking camera in an external rearward looking front side mirror or mirror replacing means, and wherein said front side mirror further comprises a first camera imaging a side area extending sideways behind the vehicle; a second camera imaging a side area extending sideways away from the vehicle; a third camera imaging a side proximity area of the vehicle; and a front blind spot camera imaging the area directly before the vehicle.

* * * * *